United States Patent
Noppel et al.

(10) Patent No.: US 8,402,736 B2
(45) Date of Patent: Mar. 26, 2013

(54) METHOD AND APPARATUS FOR SUPPRESSING AEROENGINE CONTRAILS

(75) Inventors: Frank G. Noppel, Cranfield (GB); Riti Singh, Cranfield (GB); Mark D. Taylor, Derby (GB)

(73) Assignee: Rolls-Royce PLC, London (GB)

( * ) Notice: Subject to any disclaimer, the term of this patent is extended or adjusted under 35 U.S.C. 154(b) by 542 days.

(21) Appl. No.: 12/451,503

(22) PCT Filed: Apr. 28, 2008

(86) PCT No.: PCT/GB2008/001501
§ 371 (c)(1),
(2), (4) Date: Nov. 16, 2009

(87) PCT Pub. No.: WO2008/145953
PCT Pub. Date: Dec. 4, 2008

(65) Prior Publication Data
US 2010/0132330 A1   Jun. 3, 2010

(30) Foreign Application Priority Data
May 26, 2007   (GB) .................................. 0710153.8

(51) Int. Cl.
*F01D 25/02* (2006.01)
*F02K 1/00* (2006.01)
(52) U.S. Cl. ...... 60/39.5; 60/770; 244/1 TD; 244/134 R
(58) Field of Classification Search ................. 60/39.5, 60/802, 770, 771, 796; 244/1 TD, 1 R, 134 R, 244/134 D; 356/311, 317, 318, 336–343, 356/437–438; 239/265.11, 265.13, 265.33
See application file for complete search history.

(56) References Cited

U.S. PATENT DOCUMENTS

| | | | |
|---|---|---|---|
| 3,289,409 A | 12/1966 | Schirmer | |
| 3,517,505 A | 6/1970 | Anderson et al. | |
| 4,495,500 A * | 1/1985 | Vickers | 342/59 |
| 4,557,106 A * | 12/1985 | Ffowcs Williams et al. | 60/39.281 |
| 4,585,341 A * | 4/1986 | Woodfield | 356/28.5 |
| 5,005,355 A | 4/1991 | Singh | |
| 5,285,256 A | 2/1994 | Nelson et al. | |
| 5,442,907 A * | 8/1995 | Asquith et al. | 60/778 |

(Continued)

FOREIGN PATENT DOCUMENTS

| EP | 1 544 639 A2 | 6/2005 |
|---|---|---|
| EP | 1 852 590 A2 | 11/2007 |

OTHER PUBLICATIONS

Schumann, U. et al, "In situ observation of particles in jet aircraft exhausts and contrails for different sulfur-containing fuels", Mar. 20, 1996; Journal of Geophysical Research vol. 101; pp. 6853-6854.*

(Continued)

*Primary Examiner* — Ted Kim
*Assistant Examiner* — Andrew Nguyen
(74) *Attorney, Agent, or Firm* — Oliff & Berridge, PLC

(57) ABSTRACT

A method of operating an aircraft, and the aircraft itself, comprising a gas turbine engine that exhausts a plume of gases in use, the aircraft is characterized by comprising an electromagnetic radiation generator and a waveguide to direct electromagnetic radiation at the exhaust plume to avoid the formation of contrails.

18 Claims, 4 Drawing Sheets

U.S. PATENT DOCUMENTS

| | | | |
|---|---|---|---|
| 5,546,183 A | 8/1996 | Fegley et al. | |
| 6,453,660 B1 * | 9/2002 | Johnson et al. | 60/39.821 |
| 7,028,947 B2 * | 4/2006 | Burns | 244/1 TD |
| 7,196,795 B2 * | 3/2007 | Ura et al. | 356/437 |
| 2006/0010875 A1 * | 1/2006 | Mahoney et al. | 60/772 |
| 2006/0202088 A1 * | 9/2006 | Padan | 244/137.1 |

OTHER PUBLICATIONS

Great Britain Search Report mailed Sep. 7, 2007 for Great Britain Patent Application No. 0710153.8 filed May 26, 2007.

International Search Report mailed Feb. 5, 2009 for National Phase Application No. PCT/GB2008/001501 filed Apr. 28, 2008.

* cited by examiner

METHOD AND APPARATUS FOR SUPPRESSING AEROENGINE CONTRAILS

BACKGROUND

The present invention relates to a method and apparatus for suppressing aeroengine condensation trails (contrails).

Recent climate assessments have stressed the importance of the radiative effects of contrails on global warming. Perturbations in the planetary radiation balance are enforced by the emission of greenhouse gases, aerosols, contrails and aviation induced cirrus clouds. The radiative forcing from contrails and cirrus clouds might be larger than the radiative forcing from all other aircraft emissions combined.

In U.S. Pat. No. 3,517,505 a method of suppressing contrails comprises the steps of preheating a hydroscopic material to decomposition temperatures and introducing the preheated decomposition material into the exhaust stream of said aircraft, said preheated decomposed hydroscopic material being introduced in an amount sufficient to produce a large number of small particles to provide nuclei upon which the water produced by burning jet fuel can condense to prevent the formation of visible contrails. The decomposed hydroscopic material may be either chlorosulfonic acid or sulphur trioxide. The increased number of nuclei produces a higher number of smaller ice crystals that are not visible and can alter the radiative properties of the contrail.

U.S. Pat. No. 5,005,355 discloses a method of suppressing the formation of contrails from the exhaust of an engine operating in cold temperatures including the steps of providing a combined nucleating agent and freeze-point depressant selected from the group of water soluble monohydric, dihydric, trihydric or other polyhydric alcohols, or mixtures thereof, forming the solution into a vapour, and injecting the solution into the exhaust of the engine. The solution may include a non-corrosive surfactant. Another solution may include an organic or an inorganic nucleating agent, or mixtures thereof, in monohydric, dihydric or polyhydric alcohols, or mixtures thereof, and in addition may contain one or more surfactants. Effectively, the freezing point of water is depressed to avoid contrail formation.

These earlier attempts to suppress contrails are disadvantaged because chemicals are used and discharged into the atmosphere, the chemicals have to be transported implying a weight and space penalty, there is an engine efficiency loss due to the delivery mechanisms being in the exhaust ducts, the contrails are not suppressed with only their visibility altered and therefore the smaller contrail particles may cause global dimming. The environmental impact of the chemicals used in these earlier attempts prevent their utilisation for commercial purposes.

Therefore it is an object of the present invention to provide an aeroengine that reduces or eliminates condensation trails and/or cirrus cloud formations.

SUMMARY

In accordance with the present invention an aircraft comprising a gas turbine engine that exhausts a plume of gases in use, the aircraft is characterised by comprising an electromagnetic radiation generator and a waveguide to direct electromagnetic radiation at the exhaust plume to avoid the formation of contrails.

Preferably, electromagnetic radiation is any one of microwaves, infrared, laser or radio waves.

Usually, the electromagnetic radiation generator uses between 0.1% and 3% of the engine's power.

Normally, the electromagnetic radiation generator comprises a transformer, power electronics and a control unit.

Advantageously, the aircraft comprises sensors to measure ambient temperature, pressure, and humidity.

Advantageously the engine comprises sensors to measure engine performance parameters.

Advantageously, the aircraft may comprise a contrail detector for detecting the presence of a contrail.

Preferably, the aircraft comprises a control unit that is connected to the sensors and controls any one of the power, direction and focussing of the electromagnetic radiation generator to avoid the formation of contrails.

Preferably, the aircraft comprises an empennage and the electromagnetic radiation generator is located in the empennage.

Alternatively, the engine is surrounded by a nacelle and an electromagnetic radiation generator is located in the nacelle.

Alternatively, the engine comprises a centre-body and an electromagnetic radiation generator is located in the centre-body.

Possibly, the aircraft comprises a boom having an electromagnetic radiation generator located at its free end; the boom is movable between a stowed position and a deployed position. Advantageously, the control unit is connected to a means for moving the boom between its stowed and deployed positions.

In another aspect of the present invention there is provided a method of operating an aircraft comprising a gas turbine engine that exhausts a plume of gases in use, the aircraft is characterised by comprising an electromagnetic radiation generator and a waveguide to direct electromagnetic radiation at the exhaust plume, the method comprises the step of operating the electromagnetic radiation generator to avoid the formation of contrails.

Preferably, wherein the aircraft comprises sensors to measure ambient conditions including temperature, pressure, and humidity and the method comprising the steps of determining whether a condition is sufficient to allow the formation of contrails and operating the electromagnetic radiation generator.

Alternatively, the aircraft comprises a contrail detector, the method comprising the step of detecting the presence of a contrail and operating the electromagnetic radiation generator.

Preferably, the engine comprises sensors to measure engine performance parameters and the method comprising the step of determining whether a condition is sufficient to allow the formation of contrails and operating the electromagnetic radiation generator.

Alternatively, the aircraft comprises a boom having an electromagnetic radiation generator located at its free end and the method comprising the step of moving the boom between a stowed position and a deployed position for operation to avoid the formation of contrails.

BRIEF DESCRIPTION OF THE DRAWINGS

The present invention will be more fully described by way of example with reference to the accompanying drawings in which.

DETAILED DESCRIPTION OF EMBODIMENTS

Figure 1:
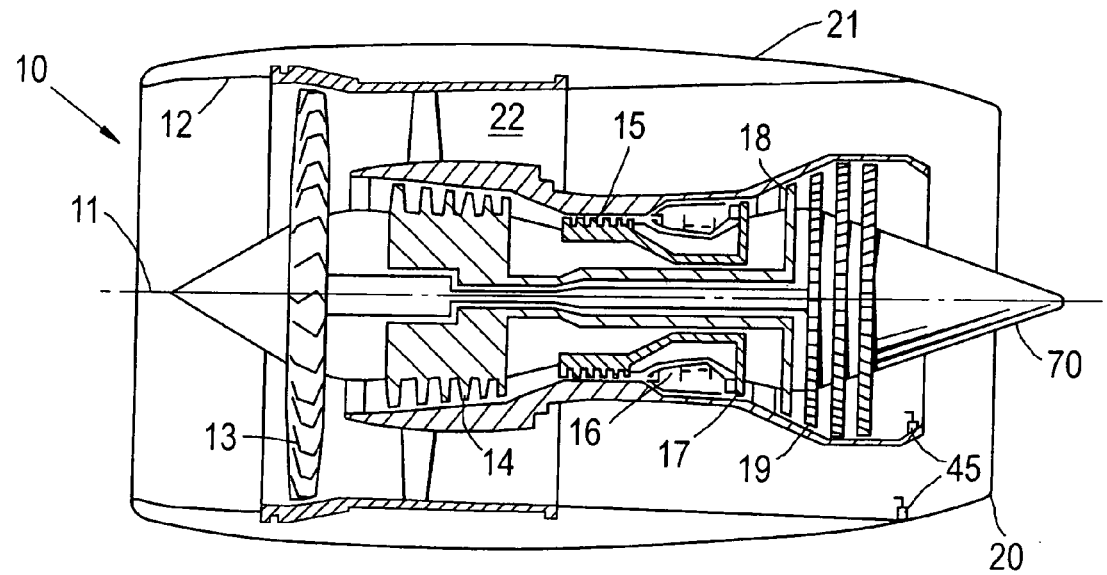
FIG. 1 is a schematic section of part of a ducted fan gas turbine engine incorporating aspects of the present invention.

With reference to FIG. 1, a ducted fan gas turbine engine generally indicated at 10 has a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, and intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high, intermediate and low-pressure turbines 17, 18, 19 respectively drive the high and intermediate pressure compressors 15, 14 and the fan 13 by suitable interconnecting shafts.

The combustion cycle of a gas turbine engine produces mainly carbon oxides and water with some nitrous and sulphur oxides. Where the atmosphere is cold enough, the water can form ice particles around ambient particles or engine exhaust particles such as soot, known as condensation nuclei. The mixing between the exhaust plume from the engine and the atmosphere causes super saturation with respect to water in the exhaust plume. As mixing and ice particle formation continues, the humidity of the plume diminishes (to ambient conditions).

It is understood that if the ice particles were evaporated once they have formed, condensation would not recur since the liquid phase of water is required for ice particle formation. Thus the object of the present invention is to avoid formation of contrails that occur in ice-supersaturated regions in the atmosphere. This object is achieved by evaporation of the water or ice particles.

If the atmosphere is supersaturated with respect to ice, contrails persist as long as the atmosphere is sufficiently supersaturated. On a global scale, contrails of current engines reflect incoming solar radiation to a lesser extend than they reflect terrestrial radiation, hence contributing to global warming. Due to concerns regarding the environmental impact from persistent contrails, it is desired to avoid their formation.

Figure 2:
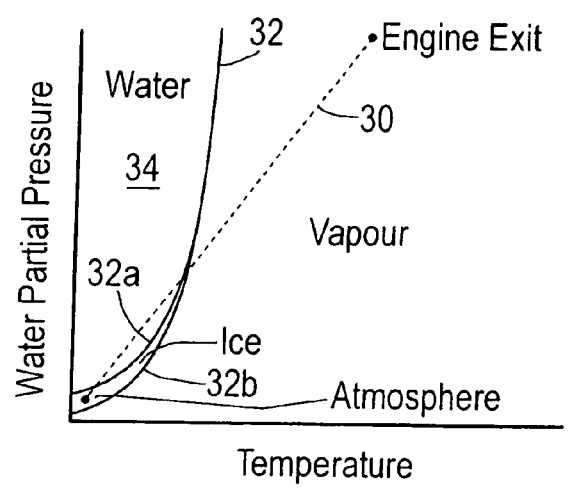
FIG. 2 is a phase diagram of water showing the principle of contrail formation.

The principle of contrail formation is shown on a phase diagram of water in FIG. 2. Relatively warm and moist gases leave the engine. The mixing of the engine exhaust efflux and ambient air is assumed to take place adiabatically and isobarically, with temperature and humidity mixing at equal rates. In a phase diagram, this can be displayed as a straight line 30. If the line 30 crosses the area 34 for which water exist in the liquid phase, a contrail is capable of forming.

If the water or condensation nuclei temperature was elevated during the mixing process, the crossing of the liquid saturation pressure line 32a could be avoided. This would imply the avoidance of the formation of a contrail. Alternatively, ice particles could be evaporated once they have formed.

Figure 3:
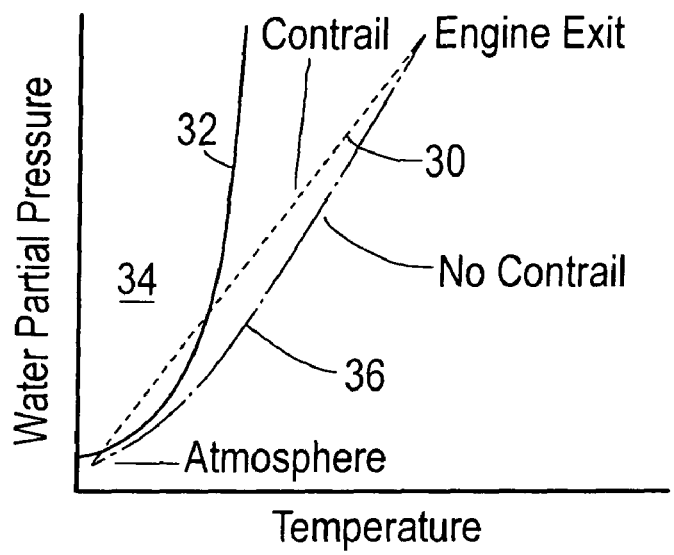
FIG. 3 is a phase diagram showing how the input of energy into the exhaust efflux plume during mixing with ambient air avoids contrail formation.
Figure 4:
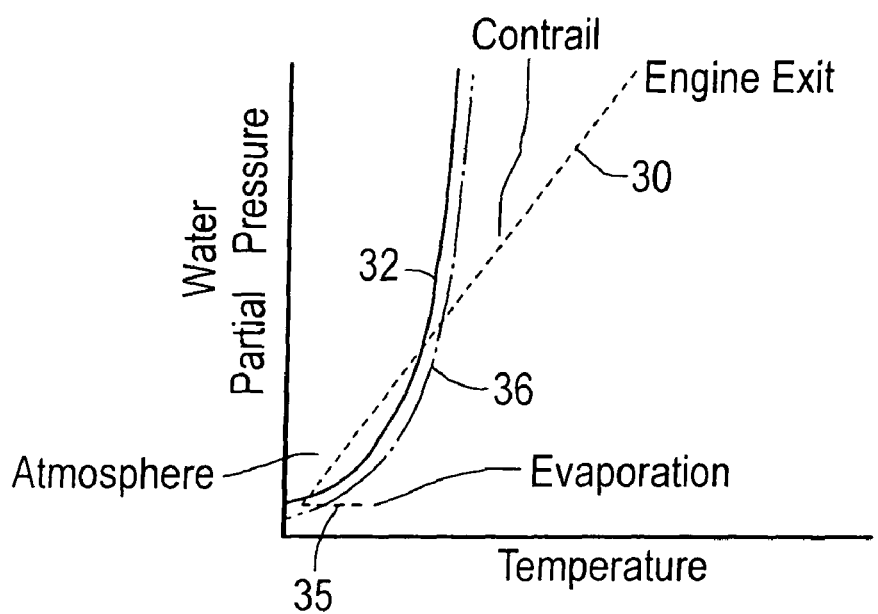
FIG. 4 is a phase diagrams showing how the input of energy into ice particles avoids contrail formation.

These two principles are illustrated in FIGS. 3 and 4. In FIG. 3, heat is induced into the exhaust efflux plume during the mixing process. As humidity and temperature do not mix at equal rates anymore, a mixing line 36 becomes curved and does not enter the area 34 on the phase diagram where water is present in the liquid phase and therefore contrails are avoided.

In FIG. 4, heat is induced in the exhaust plume after the ice particles have formed. This causes evaporation of the ice particles, line 35. Re-condensation of water would not occur because the liquid phase would be avoided.

It should be appreciated that a combination of heating the exhaust efflux and the ice particles may be used to avoid the formation of contrails.

The energy required to evaporate one mass unit of ice is determined by its latent heat $h_{latent}$. The energy required to raise the temperature of one mass unit of water by $\Delta T$ is determined by the specific heat capacity $c_p$. The amount of water in the plume is defined by the engine fuel flow $m_{fuel}$ times the emission index of water ($EI_{water} = m_{water}/m_{fuel}$). In order to account for ambient water freezing on contrail particles, a factor $c_{AMB}$ is introduced. Since the device is likely to not operate 100% efficient, the efficiency of the device $\eta_{device}$ is taken into account. With these assumptions, the power required to evaporate the ice particles in the exhaust plume becomes:

$$P_{plume\ water} = (h_{latent} + c_p \Delta T) \dot{m}_{fuel} EI_{water} c_{AMB} \frac{1}{\eta_{device}}$$

If it is assumed that heat energy is induced into the plume water prior to condensation, the latent heat should not be taken into account and can be neglected.

The useful power delivered by the engine is defined by its overall efficiency $\eta_0$ and fuel flow rate $m_{fuel}$ multiplied with the fuel calorific value FCV.

$$P_{engine} = \dot{m}_{fuel} FCV \eta_0$$

The fraction $P_{plume\ water}/P_{engine}$ is used to assess the engine performance loss if a contrail avoidance device is operated. With the above equations, the ratio becomes $$\frac{P_{plume\ water}}{P_{engine}} = \frac{(h_{latent} + c_p \Delta T) EI_{water} c_{IWC}}{\eta_{device} FCV \eta_0}$$

Depending on assumptions made, the power required for such a device could be as little as 0.1% of the engine power.

The present invention relates to a device to induce heat in the plume via electromagnetic radiation, such as infrared, laser, microwaves and radio waves, to substantially avoid the formation of contrails. It is believed that the electromagnetic radiation generator 50 will require between 0.1% and 3% of the engine's power to significantly reduce or completely remove contrail formation. It should be noted that there are many different engines, which produce different power levels and at different flight cycle conditions and allied with environmental conditions the variance of required power may be greater or less than the above range.

The radiation is matched to the excitation frequency of water or other substances in the aircraft exhaust.

Figure 5:
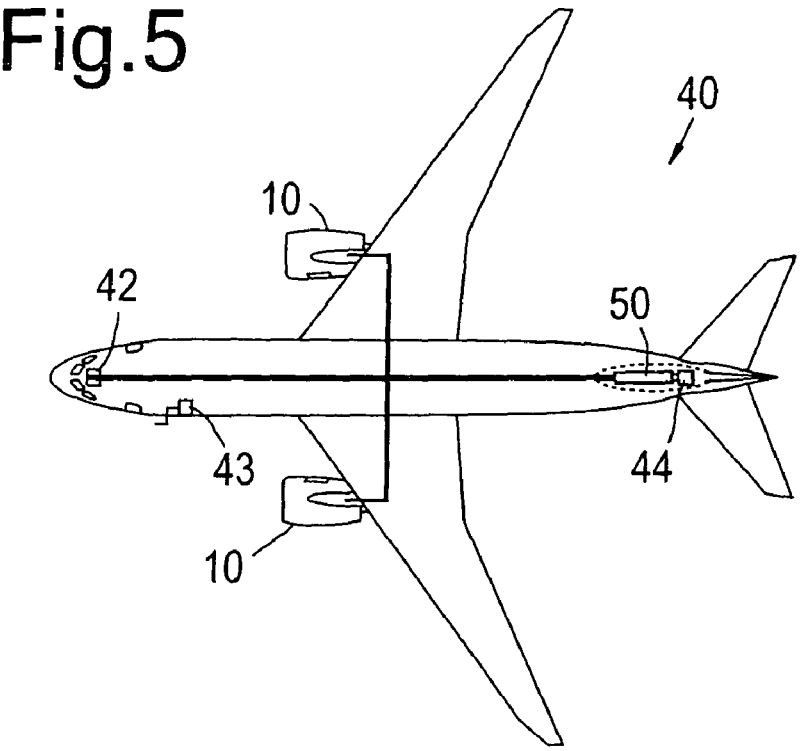
FIG. 5 is a schematic plan view of an aircraft comprising a contrail avoidance device in accordance with the present invention.
Figure 6:
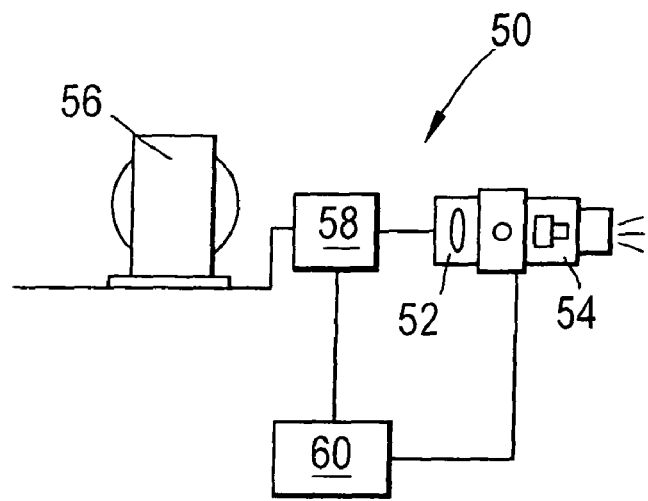
FIG. 6 is a schematic layout of components of the contrail avoidance device in accordance with the present invention.

Referring to FIG. 5, such a contrail avoidance device communicates with the engines 10 and other avionics equipment 42 on an aircraft 40. On board sensors 43 measure the ambient temperature, pressure, and humidity. Other sensors 45 measure engine performance and are a common aspect of modern gas turbine engines and aircraft. Depending on the engine efficiency and the exhaust gas parameters, it is decided whether contrail formation is possible. In addition or alternatively, a camera or other contrail detector (as described in U.S. Pat. No. 5,285,256, U.S. Pat. No. 5,546,183, EP1544639) 44 observes the engine plume for contrail formation. However, humidity measurements decide over whether the contrail is persistent. If the conditions for persistent contrail formation are satisfied, the contrail avoidance device 50 is switched on until measurements indicate that the formation of persistent contrails is no longer possible.

In an exemplary embodiment of the present invention, the contrail avoidance device 50 comprises a magnetron 52 to generate microwaves, a waveguide 54, a transformer 56, power electronics 58 and a control unit 60. Electrical power is supplied by the engines 10 or auxiliary power unit (APU) to the transformer 58 in the form of alternating or direct current and is transformed to a high voltage. The power electronics 58 meter the electrical input to the magnetron 52 which produces radio magnetic waves that match the excitation frequency of the substances in the plume. The microwaves are focused by the waveguide 54 into a suitable microwave beam for the particular plume and contrail characteristics, which may vary depending on engine and ambient conditions.

Figure 7:
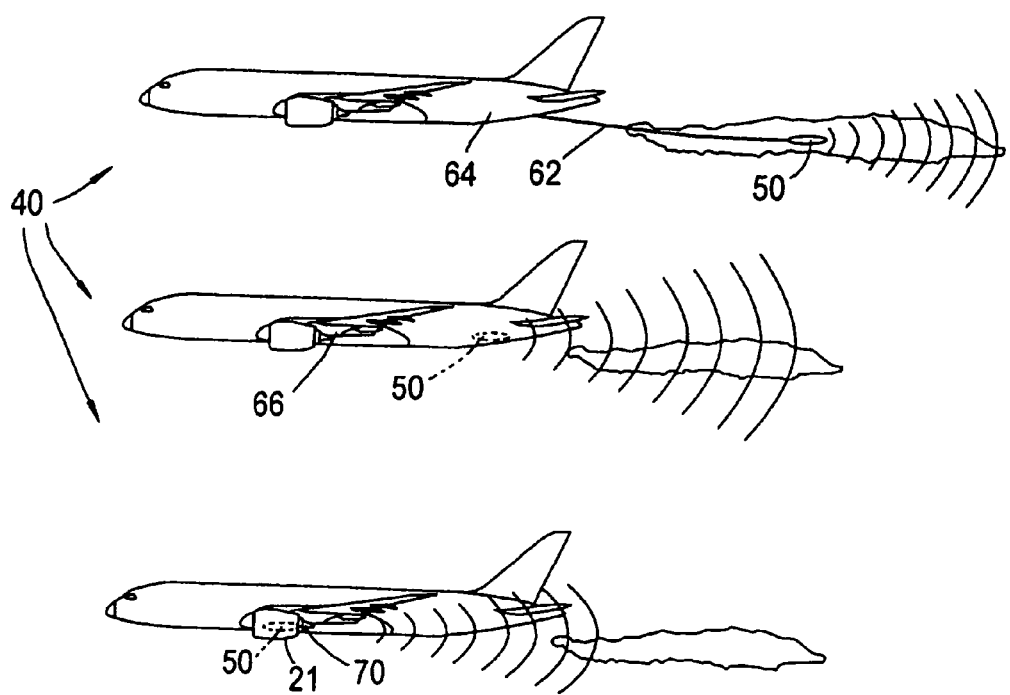
FIG. 7 show three possible configurations of an aircraft comprising the contrail avoidance device in accordance with the present invention.

The device 50, or several devices 50, can be installed at several locations in the aircraft 40 as shown in FIG. 7. The contrail avoidance device 50 is attached to a boom 62 so that it may be positioned directly in the engine wake where contrail formation would otherwise occur. This is advantageous in that the power required to generate the microwaves is minimised. The boom device 62 would only be deployed when necessary, otherwise it is stowable in the rear fuselage or empennage 64 of the aircraft 40. A winch or other suitable deployment means may be utilised.

The contrail avoidance device 50 may also be installed in the rear of the aircraft 40, or close to the engine 10 for example in a pylon 66 attaching the engine to the airframe, a nacelle 21 surrounding the engine or a centre-body 70 around which the exhaust efflux passes.

It should be appreciated that more than one electromagnetic radiation generator 50 may be provided and which may be located in more than one position such as in the empennage 64, the nacelle(s) 21, the centre-body 70 of the engine or at a free end of the boom 62. Other positions such as the wing or fuselage may also be utilised.

The control unit 60 not only controls the magnetron 52 and power electronics 58, but also deployment of the boom 62. The control unit 60 also controls the focussing and directing of the waveguide 54.

The present invention also lends itself to a method of operating the aircraft. The method comprises the step of operating the electromagnetic radiation generator 50 to avoid the formation of contrails. In particular the control unit 60 receives data from the sensors 43, which measure ambient conditions including temperature, pressure, and humidity, and compares the data to predetermined conditions known to be sufficient to allow the formation of contrails and then sends a signal to operate the electromagnetic radiation generator 50. Similarly, the method comprises reading the sensors 45 to measure engine performance parameters and determining whether a parameter is sufficient to allow the formation of contrails and operating the electromagnetic radiation generator 50. Although each of the sensor groups for ambient conditions and engine parameters 45 may be used independently of one another, they may be combined to provide a check for when contrails form or a minimum level to operate the contrail avoidance device.

The method of operating an aircraft also encompasses deployment of the boom 62 and location of the electromagnetic radiation generator 50 for optimal positioning relative to the exhaust plume to avoid the formation of contrails.

As a further check to ensure contrails are forming, before operation of the electromagnetic radiation generator 50, and that it is operating optimally, a contrail detector 44 (FIG. 5) is located in the rear fuselage or empennage 64. The pilots having ultimate control over employment of the generator 50 and its power output as well as the deployment of the boom 62.

It should be appreciated that every flight does not experience the conditions that allow contrails to form. The conditions necessary for contrail formation will only be present during part of the flight cycle. Therefore the electromagnetic radiation generator 50 is not required to operate constantly and therefore it is believed that minimal additional fuel burn will occur for aircraft fitted with the present invention.

The invention claimed is:

1. An aircraft comprising:
a gas turbine engine that exhausts a plume of gases;
an electromagnetic radiation generator;
a contrail detector for detecting the presence of a contrail; and
a waveguide directing sufficient electromagnetic radiation at the exhaust plume to significantly reduce the formation of contrails,
wherein the waveguide is activated when the contrail detector detects the presence of a contrail and directs sufficient electromagnetic radiation at the exhaust plume to evaporate water and ice particles.

2. An aircraft as claimed in claim 1 wherein electromagnetic radiation is any one of microwaves, infrared, laser or radio waves.

3. An aircraft as claimed in claim 1 wherein the electromagnetic radiation generator uses between 0.1% and 3% of the engine's power.

4. An aircraft as claimed in claim 1 wherein the electromagnetic radiation generator comprises a transformer, power electronics and a control unit.

5. An aircraft as claimed in claim 1 wherein the aircraft comprises sensors to measure ambient temperature, pressure, and humidity.

6. An aircraft as claimed in claim 1 wherein the engine comprises sensors to measure engine performance parameters.

7. An aircraft as claimed in claim 5 wherein the aircraft comprises a control unit that is connected to the sensors or the contrail detector and controls any one of the power, direction and focusing of the electromagnetic radiation generator to avoid the formation of contrails.

8. An aircraft as claimed in claim 1 wherein the aircraft comprises an empennage and the electromagnetic radiation generator is located in the empennage.

9. An aircraft as claimed in claim 1 wherein the engine is surrounded by a nacelle and the electromagnetic radiation generator is located in the nacelle.

10. An aircraft as claimed in claim 1 wherein the engine comprises a centre-body and the electromagnetic radiation generator is located in the centre-body.

11. An aircraft as claimed in claim 6 wherein the aircraft comprises a boom having the electromagnetic radiation generator located at its free end, the boom is movable between a stowed position and a deployed position.

12. An aircraft as claimed in claim 11 wherein a control unit is capable of moving the boom between its stowed and deployed positions.

13. A method of operating an aircraft comprising a gas turbine engine that exhausts a plume of gases, the aircraft comprising an electromagnetic radiation generator and a waveguide to direct electromagnetic radiation at the exhaust plume, the method comprising:
operating the electromagnetic radiation generator to avoid the formation of contrails, detecting the presence of a contrail using a contrail detector,
wherein the waveguide is activated when the contrail detector detects the presence of a contrail and directs sufficient electromagnetic radiation at the exhaust plume to evaporate water and ice particles.

14. A method of operating an aircraft in accordance with claim 13, wherein the aircraft comprises sensors to measure ambient conditions including temperature, pressure, and humidity, the method further comprising:
determining whether a condition is sufficient to allow the formation of contrails; and
operating the electromagnetic radiation generator.

15. A method of operating an aircraft in accordance with claim 13, wherein the engine comprises sensors to measure engine performance parameters, the method further comprising:
determining whether a condition is sufficient to allow the formation of contrails and operating the electromagnetic radiation generator.

16. A method of operating an aircraft in accordance with claim 13, wherein the aircraft comprises a boom having the electromagnetic radiation generator located at its free end, the method further comprising:
moving the boom between a stowed position and a deployed position for operation to avoid the formation of contrails.

17. An aircraft as claimed in claim 1 wherein the electromagnetic radiation generator induces heat in the exhaust plume via electromagnetic radiation.

18. An aircraft as claimed in claim 1 wherein the electromagnetic radiation is matched to the excitation frequency of water or other substances in the exhaust plume.

* * * * *